3,480,956
CROSS-CORRELATION RADAR
George H. Sanderson, New Hyde Park, N.Y., assignor, by mesne assignments, to the United States of America as represented by the Secretary of the Army
Filed Mar. 29, 1968, Ser. No. 717,190
Int. Cl. G01s 9/06
U.S. Cl. 343—13                    1 Claim

ABSTRACT OF THE DISCLOSURE

A cross-correlation radar having a pair of pseudo-random code generators, one for generating the transmitted signal and the other for generating a replica of the transmitted signal, to be used for correlation with the received signal. A timing circuit, which includes a clock, adjusts the relative phase relationship between the code generators such that the difference in phase between the generators is equal to a predetermined delay. This predetermined delay may be a result of the inherent internal delays of the circuitry alone, or may also include the round trip transmission delay of some predetermined portion of the range.

---

The present invention relates to a radar and more particularly to a cross-correlation radar which transmits a pseudo-random code and correlates the received signal with a replica of the transmitted code for determining range.

In the field of correlation radar, it has been the general practice to employ delay devices to adjust the relative phase of the replica and the received signals at the correlation device. One of the most critical problems confronting designers of such devices has been the retention of the original shape of both the received and replica signals as generated by the pseudo-random code generators, so that sharp correlation signals are possible at the output.

The general purpose of this invention is to use only broad-band delay devices in the signal paths and to employ any additional delays, which may be necessary, in the paths of the control signals wherein signal shape is not critical. For example, the internal delay, which may be primarily due to the remoteness of the antenna from the correlation device, should be adjusted such that for zero-range the received signals and the replica are in phase at the "zero-range" correlator. For this to be possible, the internal delay would have to be equal to some integral multiple of the period of the pseudo-random signal. Adjustment of the internal delay may be accomplished by providing in the signal path of either the transmitted signal, the received signal, or the replica signal a broad-band adjustable delay means. If the delay is not broad-band, degradation of the digital signal will result and the replica will not be exactly the same as the transmitted signal and correlation will be impaired. It is well known, however, that adjustable broad-band delay devices are either non-existent or prohibitively expensive.

It is, therefore, an object of the present invention to provide a correlation radar having an adjustable internal delay which does not effect the shape of the signals to be correlated.

The exact nature of this invention as well as other objects and advantages thereof will be readily apparent from consideration of the following specification relating to the annexed drawing in which.

Figure 1:
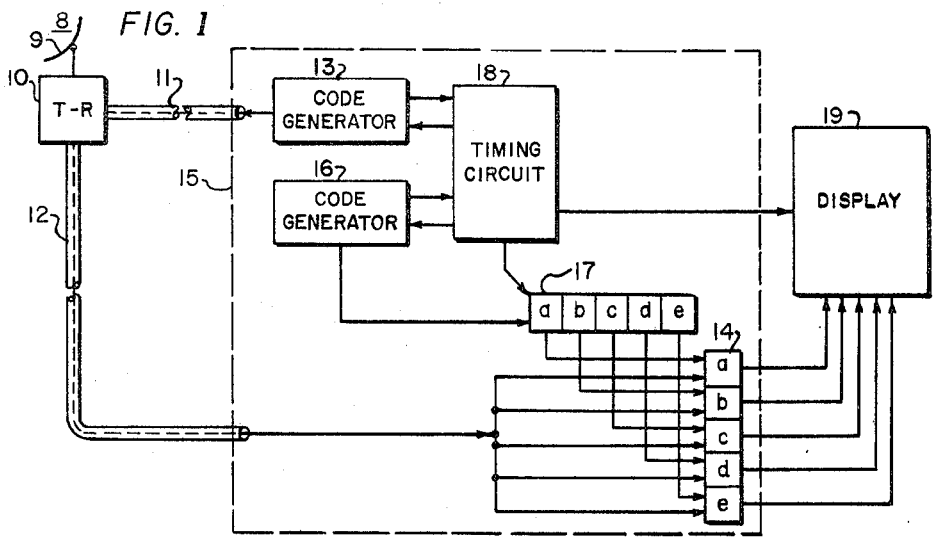
FIGURE 1 shows a block diagram of the essential components of the cross-correlation radar.

Referring now to the drawings, wherein like reference characters designate like or corresponding parts throughout the views, there is shown in FIGURE 1 a correlation radar having a remote transmit-receive head 8, which includes an antenna 9 and a transmit-receive device 10 for generating, radiating, and detecting R-F energy. A pair of transmission cables 11 and 12 connect a correlation system 15 to the TR device 10.

System 15 includes a pseudo-random code generator 13 connected to cable 11 for on-off modulation of the transmitter section of the TR device 10. Also included in system 15 is a bank of correlators 14a through 14e, each of which has one of its inputs connected to the output of the receiver section of the TR device 10 via cable 12. The system 15 further includes a second pseudo-random code generator 16, the output of which is connected to the first stage "a" of a five stage shift register 17. Each of the stages of the register 17 is connected to a different one of the correlators 14a thru 14e. Finally, a timing device 18 is provided for synchronizing the operation of the code generators 13 and 16, the register 17, and a display device 19 which is connected to the outputs of the correlators 14a thru 14e.

In general, the operation of the device of FIGURE 1 is substantially that of a cross-correlation radar. Generator 13, upon receiving a signal from circuit 18, transmits a pseudo-random digital code to the TR device 10 which then transmits, via antenna 9, R-F energy which has been on-off modulated by generator 13. Also, a signal will be transmitted, by circuit 18, to generator 16 which will generate a replica of the pseudo-random code generated by generator 13. This replica will then be transmitted via one or more of the stages of register 17 to the correlators 14a thru 14e. For example, correlator 14a will receive the code from generator 16 after being delayed by only one stage (a) of register 17 while correlator 14e will receive the replica code after being delayed by all five stages (a, b, c, d and e) of register 17.

If there is a target in the range of the radar, antenna 9 will pick up reflections therefrom, and device 10 will demodulate the received signal and then transmit the envelope of on-off pulses simultaneously to correlators 14a thru 14e via cable 12. Correlators 14a thru 14e will now correlate the received signal with the delayed replicas generated by generator 16 for the purpose of determining target range. If the delay in transmission of the signal from antenna 9 to the target and back to antenna 9 is equal to one of the delays in the replica signal as a result of the register 17, then a correlation signal will appear on the output of one of the correlators 14a thru 14e which corresponds to that particular range. For example, an output signal on correlator 14e would indicate a target at maximum range, an output on correlator 14a would indicate minimum range, and correlators 14b, 14c, and 14d would correspond to intermediate ranges. It is pointed out that substantially more correlators and register stages would be required in an actual device to increase the number of ranges at which detection will take place.

It is, therefore, important that synchronization be maintained between the code generators 13 and 16, such that at some predetermined minimum range the received signal and the replica are in phase at the inputs to correlator 14a, and that these two signals be substantial duplicates with minimum distortion. The manner in which this is accomplished may be understood with reference to FIGURE 2.

Figure 2:
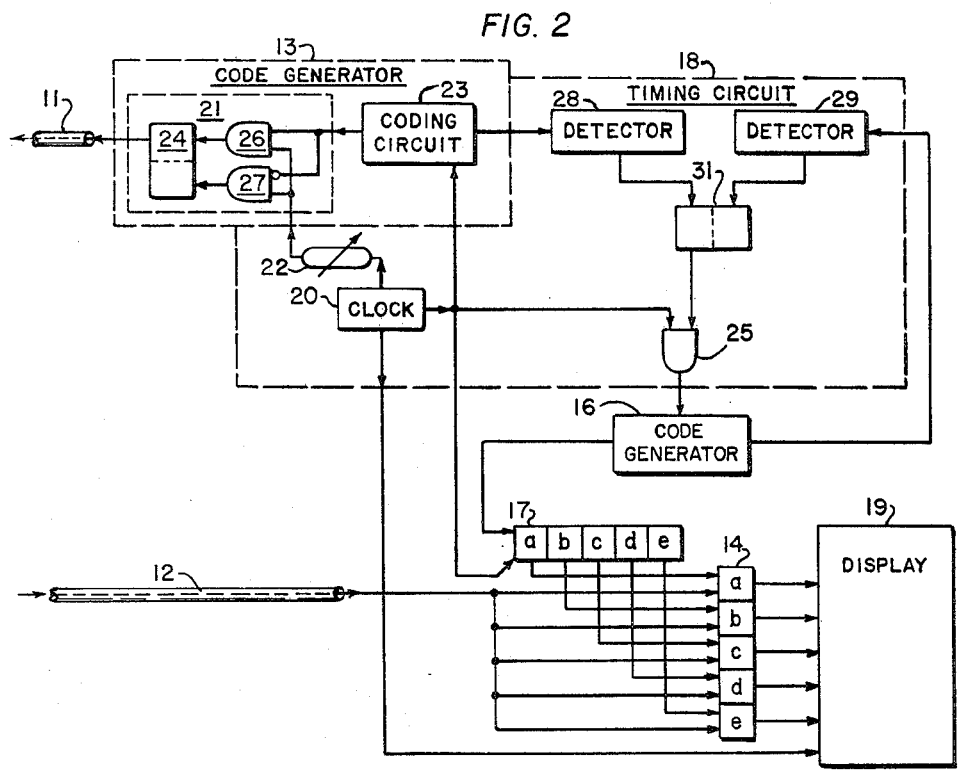
FIGURE 2 shows a detailed block diagram of a portion of the device shown in FIGURE 1.

In FIGURE 2 there is shown portions of the system of the radar shown in FIGURE 1 with portions of the timing circuit 18 shown in detail. The complete timing and synchronization of the radar system is based on clock 20 which produces timed impulses having a specified impulse spacing T. When clock 20 is turned on, timing impulses are delivered to a generator output circuit 21 in code generator 13 via a variable delay 22. The delay of device 22 should be set equal to the impulse period T minus the internal delays caused mainly, for example, by the cables 11 and 12. In this example, it will be assumed that the internal delays are some fraction of the time T between clock impulses. Therefore, the total internal delay plus the delay due to delay 22 will be equal to T.

The code generator 13 also includes a coding circuit 23 for generating the pseudo-random binary code. Impulses from clock 20 will energize the coding circuit 23 which will generate a square-wave code, having either a pulse or no pulse type of signal, at the clock rate. The code bits will be transferred in succession to the flip-flop 24 by AND gate 26 and inhibit gate 27 which are gated by the delayed clock impulses from delay 22. It will now require a time equal to one clock period T for the code signal to travel from the coding circuit 23 to the antenna 9 and back to the inputs of the correlators 14a thru 14e, ignoring any external time delays. In other words the variable delay 22 may be set such that the total internal delay from circuit 23 to correlators 14 is equal to one clock period T. Impulses from clock 20 will also be transmitted via AND gate 25 to code generator 16. Upon receiving the first impulse, code generator 16 will insert the first bit of the replica code into the "a" stage of shift register 17 which receives its shift pulses from clock 20.

Therefore, since it will now take some fraction of the clock period T, say $T_1$, for the pulses to be transmitted over the internal loop due to cables 11 and 12, and since transmission of the code pulses from generator 13 to device 10 are delayed an amount, say $T_2$, by delay 22, with respect to the transmission of the replica code from generator 16 to register 17, and since, the total internal delay, the sum of $T_1$ and $T_2$, equals T, then in order for the replica and received signals to be in phase, for zero range, at the inputs to the correlator 14a, the code generator 13 need only be advanced one bit with respect to the generator 16. In other words, the internal delay is made equal to one pulse period, and the generators 13 and 16 are synchronized out of phase with each other by one pulse, so that for zero-range, the inputs to correlator 14a are exactly in phase.

In order to insure code synchronization between the generators 13 and 16, i.e. that generator 13 is advanced one bit with respect to generator 16, circuits for detecting the state of the generators 13 and 16 are provided and control signals are generated for forcing the generators 13 and 16 to run out of phase. It is pointed out that since each generator 13 and 16 is run by the same clock impulses, bit synchronization is insured, i.e. the bits are generated simultaneously. A detector circuit 28 is connected to coding circuit 23 and a detector 29 is connected to generator 16. If the coding circuits of generators 13 and 16 are of the form of a shift register having various internal feedback means for producing a particular pseudo-random code, then the detectors 28 and 29 would be connected to the various stages of this register and would produce an output when a predetermined state of the register is detected. The output of detector 29 is connected to one input of a flip-flop 31. With an output signal from detector 29, flip-flop 31 is put in the reset state, removing its input to AND gate 25, and thereby preventing impulses from clock 20 to operate generator 16. A set input to flip-flop 31 is derived from detector 28 such that when a particular state of coding circuit 23 is detected, flip-flop 31 will be set and provide an input signal to AND gate 25, thereby starting code generator 16. It is pointed out that flip-flop 31 is constructed such that if signals should appear simultaneously on both inputs to flip-flop 31, then the signal from detector 28 will override the signal from detector 29. Thus, if generator 16 is improperly synchronized with respect to generator 13, the AND gate 25 will be inhibited and generator 16 will stop at a known state. The generator 16 will not start again until generator 13 reaches the state which is, for example, one bit advanced with respect to generator 16 as detected by detector 28 which will open AND gate 25. Of course, if the two generators 13 and 16 are in synchronization, the two input pulses to flip-flop 25 coincide and the generator 16 continues operation.

The range resolution of the radar will depend on the period T of the clock 20. The shorter the period T, the shorter will be the pulse width of the transmitted signal and the greater will be the resolution. Range ambiguity will depend on the number of bits produced in the pseudo-random code for a given period T. For example, for a given period T, the number of bits N in the entire pseudo-random code should be such that the N number of bits will at least extend over a complete round trip for full range. Of course, a greater number of bits may be used. If the pulse rate of clock 20 is increased, to increase resolution, then the internal delay, which is a constant, will be greater than the new pulse period T. In view of this, it would be necessary to alter the relative phase of the two generators 16 and 23 such that again, for some predetermined minimum range, the replica and the received signals would be in phase at the inputs to correlator 14a. This could be done by simply starting the generator 16 when the correct phase is reached. It is pointed out, however, that if the five correlators 14a thru 14e, at one clock rate, looked at the full radar range, i.e. the minimum range equals zero and the maximum range equals the full range of the radar, then these same correlators will be looking at only some portion of the full range at this second clock rate which is greater. If the relative phase of the generators 13 and 16 are adjusted such that at zero range the replica and the received signals are in phase at the inputs to correlator 14a, then the radar will be looking at the first portion of the maximum range. The radar can be made to look at other portions of the full range by adjusting the relative phase of the generators 13 and 16 accordingly. For example, the last portion of the full radar range may be looked at by adjusting the relative phase of the generators 13 and 16 such that for targets at full radar range the replica and the received signal will be in phase at the inputs to correlator 14e. These features can be provided by adding additional detectors 29, or by changing the detecting code of the detector 29, or by providing counters which will count the number of clock bits after a particular code has been reached and then starting the generator 16 at some predetermined count.

Obviously many modifications and variations of the present invention are possible in the light of the above teachings. It is therefore to be understood, that within the scope of the appended claims, the invention may be practiced otherwise than as specifically described.

What is claimed is:
1. A correlation radar comprising a transmitter means for transmitting an R-F signal; a first pseudo-random code generator means for modulating said transmitter means; a receiver means for receiving reflections of said R-F signal; a second pseudo-random code generator means for generating a signal which is a replica of the signal gen- erated by said first generator means; correlator means for correlating said replica signal with the demodulated signal of said received signal; clock means connected to both said generator means for energizing said first and second code generator means simultaneously at the rate of said clock means; an adjustable delay means connected to the output of said clock means; the output of one of said generator means including a gating means; the output of said delay means connected to said gating means for gating the output of said generator means at said clock rate and at a delayed time; detector means for periodically detecting the state of each said code generator means; and control means connected to said detector means for maintaining the relative phase of said generator means at a predetermined phase relationship.

References Cited

UNITED STATES PATENTS

| | | | |
|---|---|---|---|
| 3,386,095 | 5/1968 | Stevens | 343—17.5 |
| 3,412,334 | 11/1968 | Whitaker | 343—100.7 X |
| 3,396,392 | 8/1968 | Fishbein et al. | 343—17.2 X |

RODNEY D. BENNETT, JR., Primary Examiner

J. P. MORRIS, Assistant Examiner

U.S. Cl. X.R.

343—17.2